United States Patent
Lin et al.

(10) Patent No.: US 7,575,342 B2
(45) Date of Patent: Aug. 18, 2009

(54) LIQUID CRYSTAL DISPLAY AND BACKLIGHT MODULE INCLUDING TILTED LAMP TUBES

(75) Inventors: Yi-Wen Lin, Kaohsiung County (TW); Chih-Chie Chen, Taipei Hsien (TW); Ea-Si Lee, Kaohsiung County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 11/308,905

(22) Filed: May 25, 2006

(65) Prior Publication Data

US 2007/0274064 A1    Nov. 29, 2007

(51) Int. Cl.
*F21V 21/00* (2006.01)
*G09F 13/00* (2006.01)

(52) U.S. Cl. ............... 362/249.14; 362/97.2; 362/225; 362/240; 362/217.09

(58) Field of Classification Search .......... 362/561, 362/227, 232, 238, 239, 240, 260, 602, 614, 362/634, 633, 58, 65, 70, 67, 217, 219, 220, 362/97, 11, 97.2, 217.01, 217.02, 217.08, 362/217.09, 225, 249.14; 349/58, 65, 70, 349/67; 345/47, 102
See application file for complete search history.

(56) References Cited

U.S. PATENT DOCUMENTS

| | | | | |
|---|---|---|---|---|
| 5,101,325 A | * | 3/1992 | Davenport et al. | 362/628 |
| 5,193,899 A | * | 3/1993 | Oe et al. | 362/224 |
| 5,659,410 A | * | 8/1997 | Koike et al. | 349/62 |
| 5,709,463 A | * | 1/1998 | Igram | 362/268 |
| 6,407,781 B2 | * | 6/2002 | Kitada | 349/58 |
| 2003/0035283 A1 | | 2/2003 | Lim | 362/97 |
| 2004/0008474 A1 | * | 1/2004 | Kardach et al. | 361/681 |
| 2004/0130881 A1 | | 7/2004 | Han et al. | 362/613 |
| 2005/0047174 A1 | * | 3/2005 | Pan et al. | 362/561 |
| 2007/0058370 A1 | * | 3/2007 | Shen et al. | 362/260 |

FOREIGN PATENT DOCUMENTS

| | | | |
|---|---|---|---|
| CN | 1740871 | | 3/2006 |
| JP | 03266303 A | * | 11/1991 |
| JP | 07234405 A | * | 9/1995 |
| JP | 2005195778 | * | 7/2005 |

\* cited by examiner

*Primary Examiner*—Ismael Negron
(74) *Attorney, Agent, or Firm*—Jianq Chyun IP Office

(57) ABSTRACT

A backlight module including a light box and a plurality of lamps in the light box is provided. The light box includes a bottom plate and an opening above the bottom plate. The lamp is disposed at an angle to the bottom plate of the light box. A liquid crystal display including the above backlight module and a liquid crystal panel is further provided. The backlight module provides the plane light source for display.

14 Claims, 4 Drawing Sheets

LIQUID CRYSTAL DISPLAY AND BACKLIGHT MODULE INCLUDING TILTED LAMP TUBES

BACKGROUND OF THE INVENTION

1. Field of Invention

The present invention generally relates to a light source module and a display. More particularly, the present invention generally relates to a backlight module and a liquid crystal display.

2. Description of Related Art

The liquid crystal display (LCD) mainly consists of a liquid crystal panel and a backlight module. Since the liquid crystals in the liquid crystal panel are unable to emit light spontaneously, the backlight module is used as the surface light source to provide light for display.

The backlight module can be categorized as the edge-light type and the straight-down type. For the edge-light type backlight module, a light guide plate is used to disperse the light from the point light source and thus converts it into a plane light source for the liquid crystal panel. However, the straight-down type backlight module requires no light guide plate and provides the plane light source directly. Hence, when higher luminance is required for the liquid crystal display, the straight-down type backlight module is generally applied. The light source of the straight-down type backlight module commonly consists of a plurality of cold cathode fluorescent lamps (CCFL) arranged in parallel.

FIG. 1 is the cross-sectional view of the prior art straight-down type backlight module. As shown in FIG. 1, a plurality of cold cathode fluorescent lamps (CCFL) 120 is arranged in parallel in the light box 110 and the diffuser plate 130 and optical sheets 140 including reflection sheet(s) or prism sheet(s) are installed at the opening 112 of the light box 110. The light emitting from the lamps 120 is diffused or refracted by the diffuser plate 130 and then emits from the diffuser plate 130 as the plane light source.

The lamps 120 in the prior art structure are arranged in parallel to the diffuser plate 130 and to the bottom surface 114 of the light box 110. However, current leakage often occurs due to the small distance between the lamps 120 and the bottom surface 114 of the light box 110. Therefore, the high voltage terminal and the low voltage terminal of the lamp 120 have different values of currents, resulting in brightness variation. In general, upon the influence of current leakage, the high voltage terminal of the lamp 120 is brighter than the low voltage terminal. In addition, because of the arrangement of the lamps in the backlight module, the regions near the outermost lamps are dimmer. Accordingly, the prior art is unable to provide the backlight module suitable as the uniform plane light source, and the display quality of the liquid crystal display can be compromised.

SUMMARY OF THE INVENTION

It is therefore an object of the invention to provide a backlight module as a uniform plane light source.

It is therefore an object of the invention to provide a backlight module for improving the display quality of the liquid crystal display.

To achieve these objects and advantages, and in accordance with the purpose of the invention, as embodied and broadly described herein, the invention is directed towards a backlight module, mainly including a light box and a plurality of lamps. The light box includes a bottom plate and an opening above the bottom plate. The lamps are disposed in the light box and each lamp is disposed at an angle relative to the bottom surface of the light box. The lamps can be straight tubular lamps, S-shaped tubular lamps, L-shaped tubular lamps or U-shaped tubular lamps. The lamps are tilted to the bottom surface of the light box either in the same tilt angle or in different tilt angles.

According to the preferred embodiment, the tilt angle ranges from 0.1 degree to 8 degrees.

According to the preferred embodiment, each of the lamps includes a high voltage terminal and a low voltage terminal, and the low voltage terminal is disposed farther from the bottom plate, while the high voltage terminal is disposed closer to the bottom plate.

According to the preferred embodiment, the lamps are straight tubular lamps and the high voltage terminals of the lamps are disposed at a same side of the lamp box.

According to the preferred embodiment, the backlight module further comprises a diffuser plate at the opening of the light box.

According to the preferred embodiment, the backlight module further comprises an optical sheet disposed on the diffuser plate. For example, the optical sheet includes a brightness enhancement film or a prism sheet.

The present invention further provides a liquid crystal display including the above backlight module and a liquid crystal panel. The backlight module provides the plane light source for display.

For alleviating the uniformity in brightness of the lamps, the lamps are disposed in the light box and at an angle to the bottom plate of the light box. Since the lamp is tilted, the distances between various portions of the lamp and the bottom plate are different. In this way, the dimmer issue of certain portion of the lamp (e.g. the low voltage terminal) can be alleviated. The tilt angles of the lamps can be adjusted according to the positions of the lamps, the shape of the light box or the display requirements, for better display effects.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

For the backlight module of the present invention, each of the lamps can be designed to be disposed at an angle to the bottom surface of the light box. In this way, a portion of the lamps are disposed closer to the light-emitting surface for providing uniform brightness by compensating for the uneven brightness issues in the prior art or for adjusting the brightness depending on the display requirements. According to this invention, the shape of the lamps can be straight tubes, S-shaped tubes, U-shaped tubes or other suitable shapes, depending on the design requirements. In the following embodiments, the straight (linear) tubular lamps are used as an example for descriptions.

Figure 1:
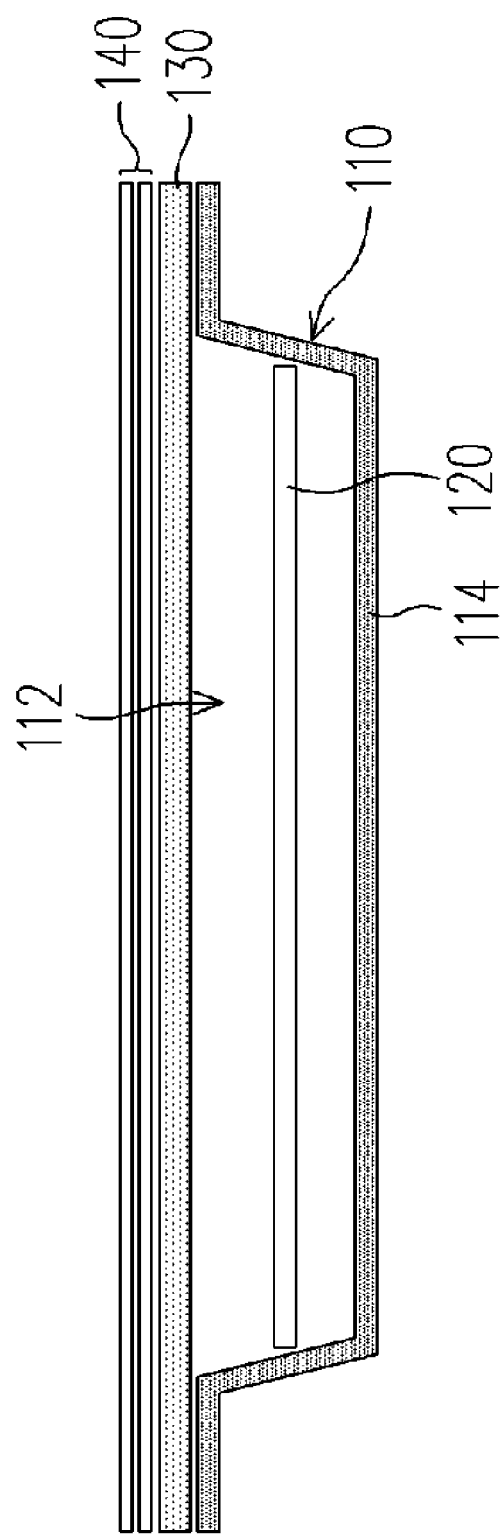
FIG. 1 is the cross-sectional view of the prior art straight-down type backlight module.
Figure 2:
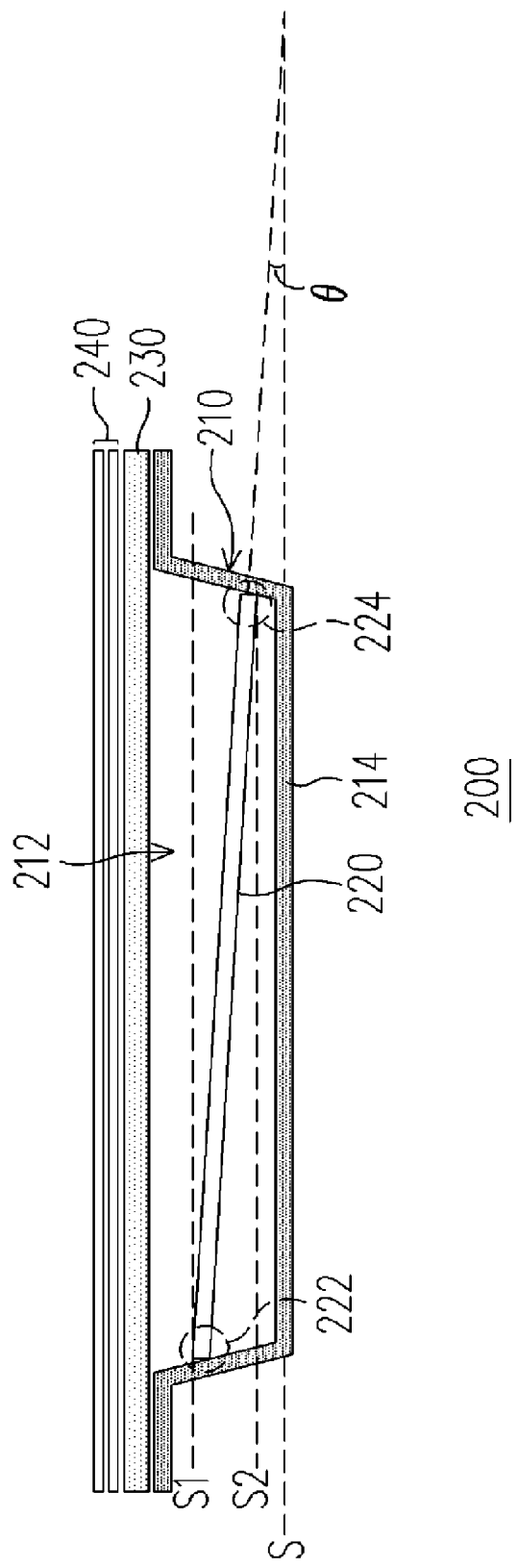
FIG. 2 is the cross-sectional view of a backlight module according to one preferred embodiment of this invention.

FIG. 2 is the cross-sectional view of a backlight module according to one preferred embodiment of this invention. As shown in FIG. 2, the backlight module 200 includes at least a light box 210 and a plurality of lamps 220. The lamps 220 are straight tubular lamps and are arranged on the same plane and in parallel to one another, for example. The light box 210 has a bottom plate 214 and an opening 212 above the bottom plate 214. Each of the lamps 220 is disposed between two planes S1 and S2 that are parallel to the bottom plate 214 (bottom surface S). That is, the lamp 220, in the light box 210, is disposed at an angle θ to the bottom surface S. The angle θ can be defined as the angle between the extending direction of the lamp 220 and its projection line on the bottom surface S. Preferably, the angle θ can be ranged from 0.1 degree to 8 degrees. Optionally, a diffuser plate 230 can be disposed at the opening 212 and parallel to the bottom plate 214. The diffuser plate 230 can diffuse or disperse the light emitting from the lamps 220 to form a uniform plane light source. In addition, optical sheets 240, including brightness enhancement film or prism sheet(s), are included and disposed above the diffuser plate 230, for better display effects.

In this embodiment, the low voltage terminal 222 of the lamp 220 is disposed on the plane S1 and at one side of the bottom plate 214, while the high voltage terminal 224 of the lamp 220 is disposed on the plane S2 and at another side of the bottom plate 214. Therefore, in this embodiment, the lamps 220 are placed on the same plane and disposed at the same angle to the bottom surface S. The low voltage terminals 222 of the lamps 220 are disposed farther from the bottom plate 214 for avoiding the possible current leakage. Accordingly, the low voltage terminals 222 of the lamps 220, which may be dimmer, are placed closer to the opening 212 of the light box, for better brightness. Therefore, the uniformity in the brightness of the resultant plane light source is improved.

Although the lamps 220 in this embodiment are placed at the same angle relative to the bottom surface of the light box, the lamps can be designed to be placed in the light box in different angles. In the following embodiment, the lamps are placed in the light box in different angles for improving the dim issue for the peripheral region of the backlight module.

Figure 3:
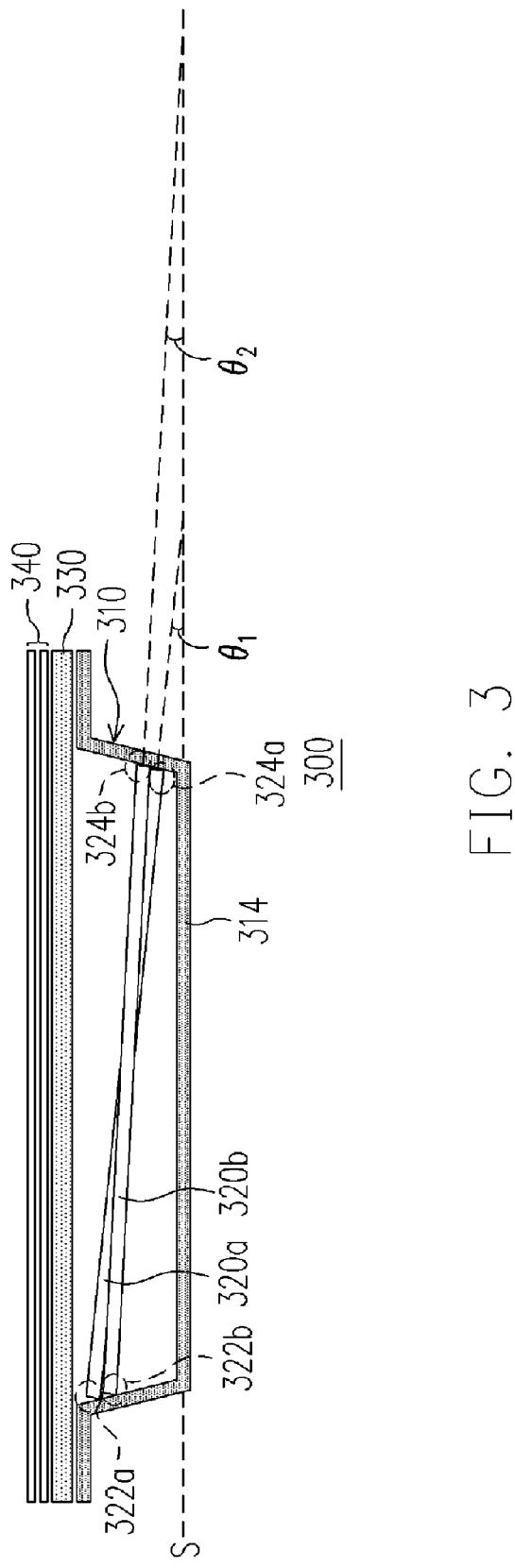
FIG. 3 is the cross-sectional view of a backlight module according to another preferred embodiment of this invention.
Figure 4:
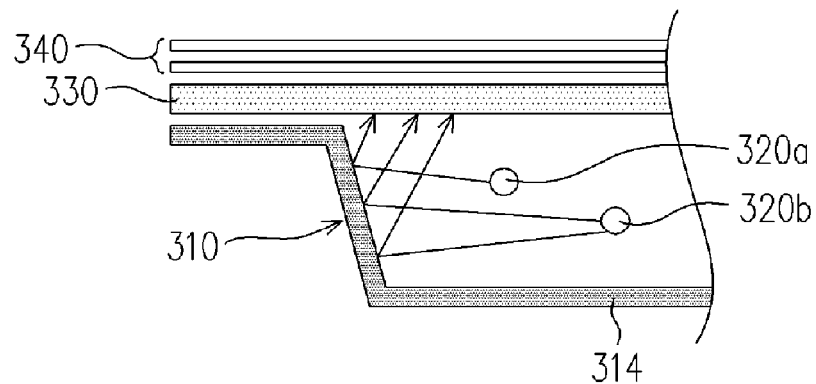
FIG. 4 is a schematic cross-sectional view of the structure in FIG. 3 turning 90 degrees.

FIG. 3 is the cross-sectional view of a backlight module according to another preferred embodiment of this invention. In FIG. 3, the backlight module 300 includes a light box 310, a plurality of lamps 320a/320b, a diffuser plate 330 and optical sheets 340. The elements similar to the above embodiment will not be described in details again. According to this embodiment, the lamps are arranged in different tilt angles. For the lamps 320a/320b, the low voltage terminals 322a/322b of the lamps 320a/320b are arranged at positions higher than those of the high voltage terminals 324a/324b of the lamps 320a/320b. The lamp 320a is arranged at an angle θ1 tilted to the bottom plate 314, while the lamp 320b is arranged at an angle θ2 tilted to the bottom plate 314. The angle θ1 or θ2 can be defined as the angle between the extending direction of the respective lamp 320a or 320b and its projection line on the bottom surface S. Preferably, the angle θ1 can be ranged from 0.1 degree to 8 degrees and the angle θ2 can be ranged from 0.1 degree to 8 degrees. FIG. 4 is a schematic cross-sectional view of the structure in FIG. 3 turning 90 degrees. From FIG. 4, because the position of the lamp 320a is different from that of the lamp 320b, the light emitting from the lamp 320b will not be hindered by the lamp 320a and will be reflected by the sidewalls of the light box 310 to the diffuser plate 330. Hence, the brightness of the light-emitting surface around the lamp 320a can be increased, thus avoiding the dim issue for the peripheral regions of the backlight module. Through the arrangement of the lamps in different tilt angles and/or in different positions, the uniformity in the brightness or the average brightness can be optimized according to the display requirements.

The above embodiments are merely feasible examples and will not be used to limit the arrangements of the lamps or the structure of the backlight module of this invention. For example, the low voltage terminals can be arranged farther from the bottom plate, for adjusting the luminance.

Figure 5:
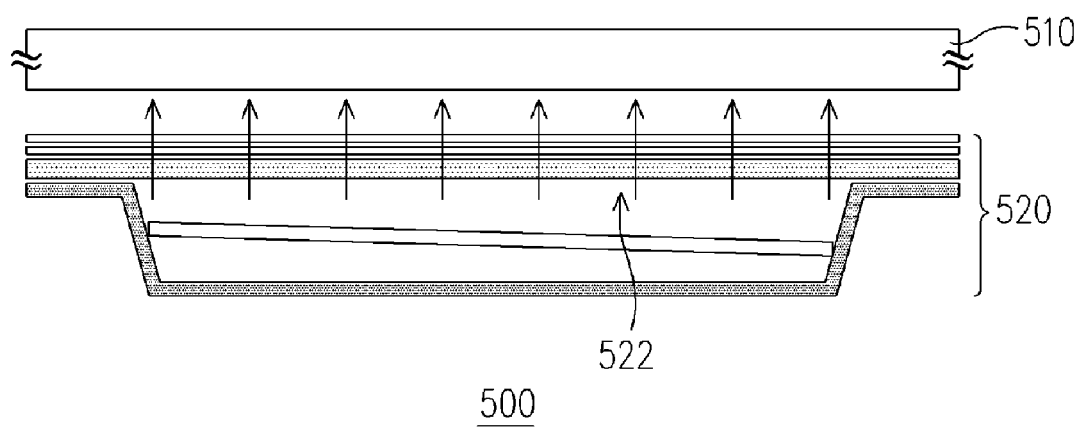
FIG. 5 is a schematic view of a liquid crystal display (LCD) according to one preferred embodiment of this invention.

By applying the backlight module, the present invention provides a liquid crystal display. FIG. 5 is a schematic view of a liquid crystal display (LCD) according to one preferred embodiment of this invention. The LCD 500 mainly includes a liquid crystal panel 510 and a backlight module 520. In this embodiment, the backlight module 520 is similar to the backlight module 200 of FIG. 2, and the elements will not be described in details herein. The liquid crystal panel 510 is disposed above the opening 522 of the backlight module 520 and uses the backlight module 520 as the plane light source for display. Alternatively, the backlight modules as shown in FIGS. 3-4 can be applied in the LCD 500.

In summary, the backlight module and the LCD provided by this invention have at least the following advantages:

The uniformity in the brightness of the backlight module is improved by disposing the lamps slantwise in the light box.

The low voltage terminals are arranged farther from the bottom plate to avoid current leakage and enhance illumination efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
   a light box having a bottom plate and an opening above the bottom plate; and
   a plurality of lamps disposed in the light box, wherein each of the lamps is tilted to a bottom surface of the light box at a tilt angle between an extending direction of the lamp and a corresponding projection line on the bottom surface, each of the tilt angles is fixed, and the tilt angles of the lamps are different, wherein each of the lamps includes a high voltage terminal and a low voltage terminal, and the low voltage terminal is disposed farther from the bottom plate while the high voltage terminal is disposed closer to the bottom plate.

2. The backlight module of claim 1, wherein the lamps are straight tubular lamps and the high voltage terminals of the lamps are disposed at a same side of the light box.

3. The backlight module of claim 1, wherein the lamps are S-shaped tubular lamps, L-shaped tubular lamps or U-shaped tubular lamps.

4. The backlight module of claim 1, wherein the tilt angle ranges from 0.1 degree to 8 degrees.

5. The backlight module of claim 1, further comprising a diffuser plate at the opening of the light box.

6. The backlight module of claim 5, further comprising an optical sheet disposed on the diffuser plate.

7. The backlight module of claim 6, wherein the optical sheet includes a brightness enhancement film or a prism sheet.

8. A liquid crystal display, comprising:
a backlight module, comprising:
a light box having a bottom plate and an opening above the bottom plate; and
a plurality of lamps disposed in the light box, wherein each of the lamps is tilted to a bottom surface of the light box at a tilt angle between an extending direction of the lamp and a corresponding projection line on the bottom surface, each of the tilt angles is fixed, and the tilt angles of the lamps are different, wherein each of the lamps includes a high voltage terminal and a low voltage terminal, and the low voltage terminal is disposed farther from the bottom plate, while the high voltage terminal is disposed closer to the bottom plate; and a liquid crystal panel disposed above the opening.

9. The display of claim 8, wherein the lamps are straight tubular lamps and the high voltage terminals of the lamps are disposed at a same side of the light box.

10. The display of claim 8, wherein the lamps are S-shaped tubular lamps, L-shaped tubular lamps or U-shaped tubular lamps.

11. The display of claim 8, wherein the tilt angle ranges from 0.1 degree to 8 degrees.

12. The display of claim 8, further comprising a diffuser plate at the opening of the light box.

13. The display of claim 12, further comprising an optical sheet disposed on the diffuser plate.

14. The display of claim 13, wherein the optical sheet includes a brightness enhancement film or a prism sheet.

* * * * *